(12) United States Patent
Westmeyer et al.

(10) Patent No.: US 10,419,131 B2
(45) Date of Patent: Sep. 17, 2019

(54) CYBER-RETRO-REFLECTOR TECHNOLOGY

(71) Applicants: Paul Westmeyer, Lancaster, PA (US); Renee Mazaheri, Lancaster, PA (US)

(72) Inventors: Paul Westmeyer, Lancaster, PA (US); Renee Mazaheri, Lancaster, PA (US)

(*) Notice: Subject to any disclaimer, the term of this patent is extended or adjusted under 35 U.S.C. 154(b) by 0 days.

(21) Appl. No.: 15/878,777

(22) Filed: Jan. 24, 2018

(65) Prior Publication Data

US 2018/0212687 A1     Jul. 26, 2018

Related U.S. Application Data

(60) Provisional application No. 62/450,791, filed on Jan. 26, 2017.

(51) Int. Cl.
| | |
|---|---|
| *H04B 10/114* | (2013.01) |
| *H04B 10/85* | (2013.01) |
| *H04L 29/06* | (2006.01) |
| *H04B 10/11* | (2013.01) |
| *H04B 10/80* | (2013.01) |

(52) U.S. Cl.
CPC ............ *H04B 10/85* (2013.01); *H04B 10/11* (2013.01); *H04B 10/803* (2013.01); *H04L 63/1425* (2013.01)

(58) Field of Classification Search
CPC ............................................ H04B 10/114–116
See application file for complete search history.

(56) References Cited

U.S. PATENT DOCUMENTS

| | | | | |
|---|---|---|---|---|
| 5,051,601 | A | * | 9/1991 | Atobe ............... H04B 10/1143 250/551 |
| 5,698,452 | A | | 12/1997 | Goossen |
| 6,826,369 | B1 | * | 11/2004 | Bondarev .......... H04B 10/1143 398/106 |
| 8,363,987 | B2 | | 1/2013 | Bagheri |
| 8,724,934 | B2 | | 5/2014 | Bagheri |
| 9,749,342 | B1 | * | 8/2017 | Krage ...................... G06F 9/46 |

(Continued)

OTHER PUBLICATIONS

Uysal et. al., optical wireless communications—an emerging technology, 16th International Conference on Transparent Optical Networks, Jul. 10, 2014.

(Continued)

*Primary Examiner* — Shi K Li
(74) *Attorney, Agent, or Firm* — Schaffer, Schaub & Marriott L.P.D.

(57) ABSTRACT

This cyber-retro-reflector technology is a series of Architectures, representing staged deployments, including backward compatibility, of products with enhanced features, for integrating technologies and capabilities, of electronic and photonic systems to: (a) reduce power consumption for circuits and systems that are placed into 'off' and/or disabled states, including external interface portals of electronic and photonic systems, (b) increase and enhance intra-/interconnectivity, interoperability, and functionality of a system and the aggregate of systems, (c) increase and enhance integrated capabilities leading to higher computational performance for the system and the aggregate of systems, (d) take full advantage of photonic capabilities, and (e) improve hacking detection.

18 Claims, 11 Drawing Sheets

Cross Section of 4-Layer Circuit Card, 11 rows of Integrated Circuit Chips, & 4 Retro-Reflectors Optical Pathways

(56) References Cited

U.S. PATENT DOCUMENTS

| | | | | |
|---|---|---|---|---|
| 2005/0123113 | A1* | 6/2005 | Horn | G06F 21/85 379/199 |
| 2008/0014867 | A1 | 1/2008 | Finn | |
| 2010/0215224 | A1* | 8/2010 | Saito | G06K 9/00067 382/124 |
| 2014/0018023 | A1* | 1/2014 | Lee | H04B 1/03 455/128 |
| 2014/0308045 | A1* | 10/2014 | Pederson | H04B 10/40 398/135 |
| 2016/0072768 | A1* | 3/2016 | Ibsies | H04W 12/08 726/3 |
| 2016/0285551 | A1* | 9/2016 | Mateti | H04B 10/1123 |

OTHER PUBLICATIONS

Notification of Transmittal of the International Search Report and the Written Opinion of the International Searching Authority, or the Declaration, Apr. 24, 2018.

* cited by examiner

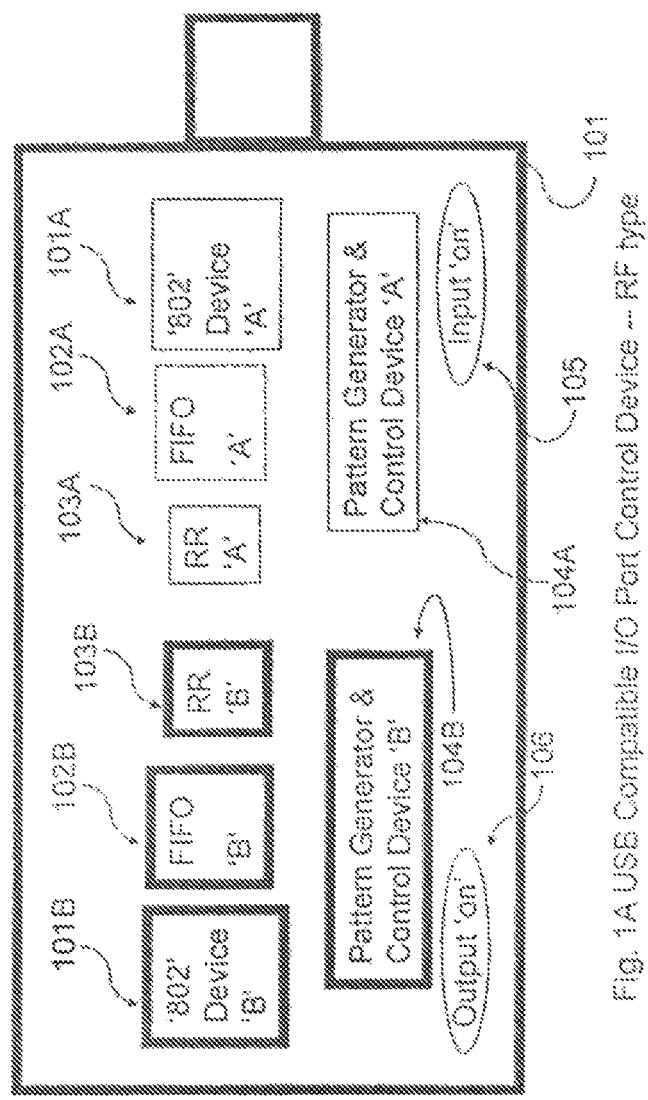
Fig. 1A USB Compatible I/O Port Control Device -- RF type

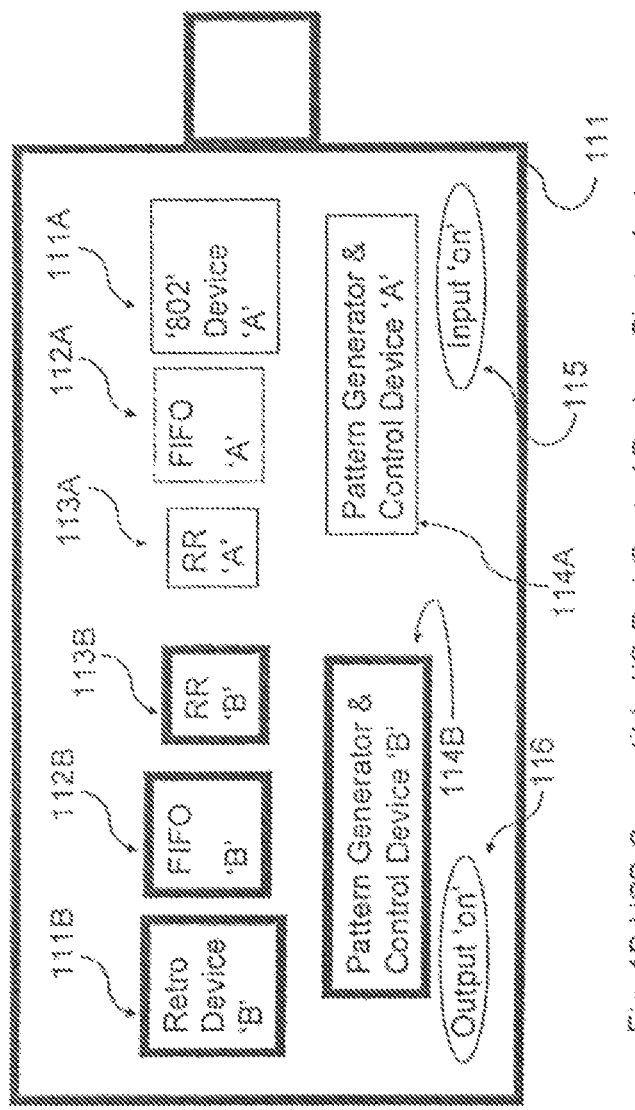
Fig. 1B USB Compatible I/O Port Control Device —Photonic type

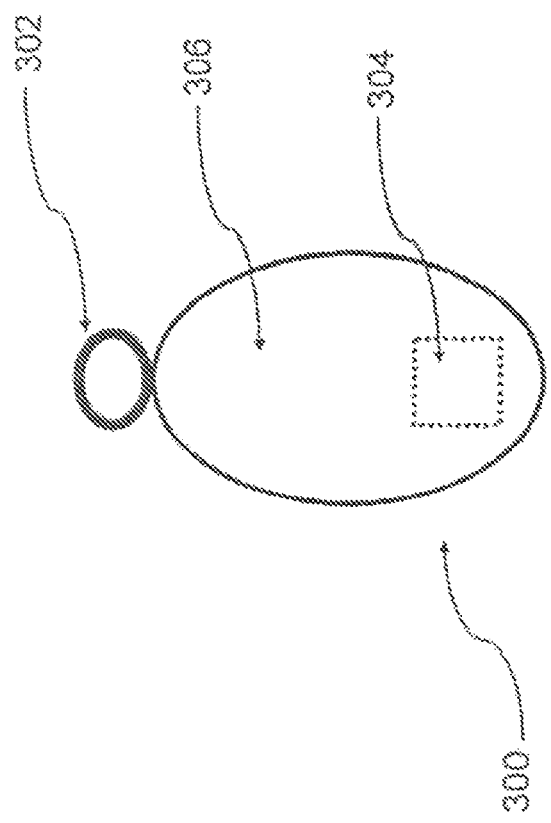
Fig. 1C: User worn dongle, half of Pair, active Retro-reflector '304'

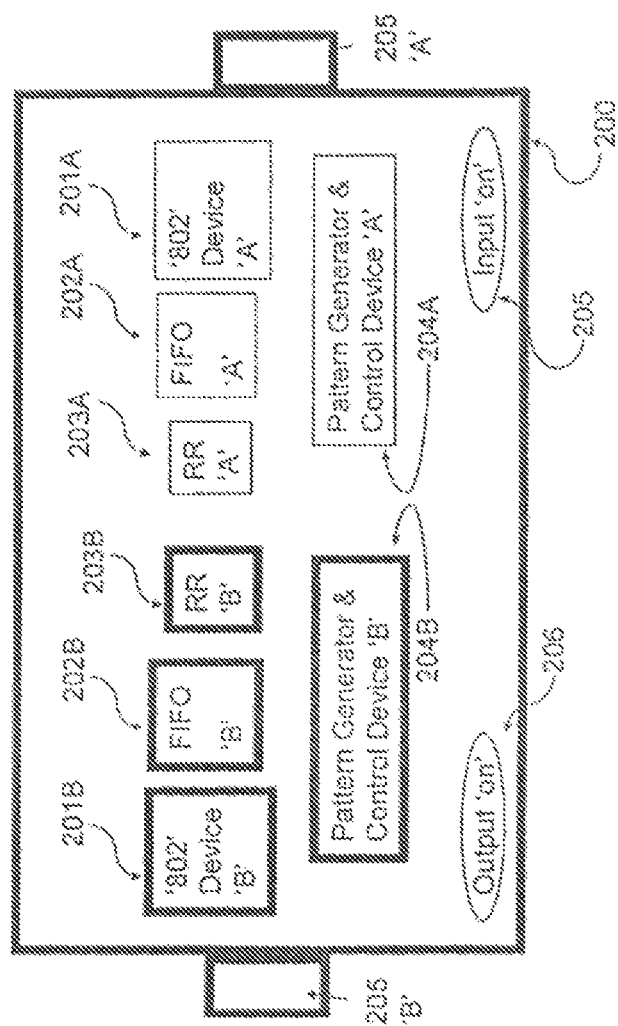
Fig. 2 Hardline (wired) I/O Port Control Device

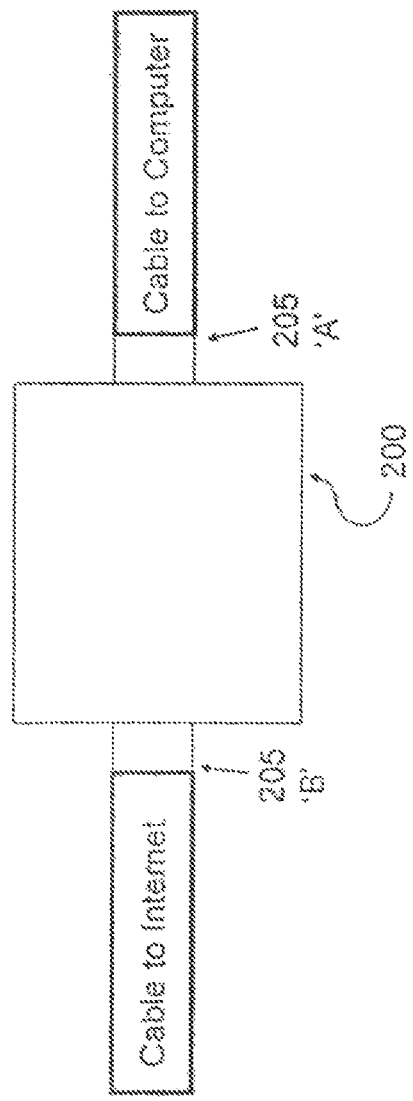
Fig. 3 Simplified Hardline (wired) I/O Port Control Device

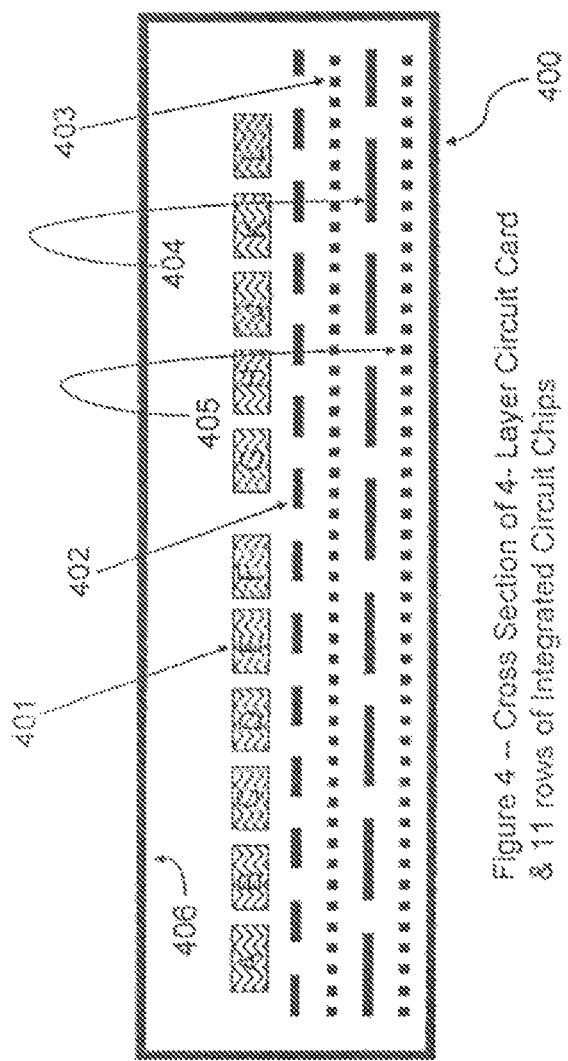
Figure 4 – Cross Section of 4- Layer Circuit Card & 11 rows of Integrated Circuit Chips

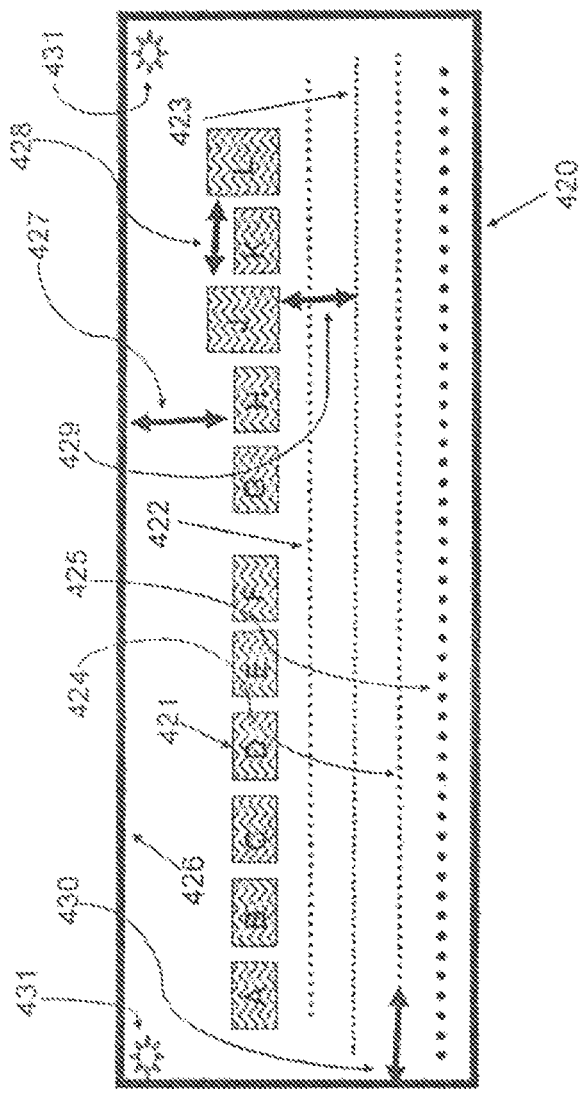
Figure 5A – Cross Section of 4- Layer Circuit Card, 11 rows of Integrated Circuit Chips, & 4 Retro-Reflectors Optical Pathways

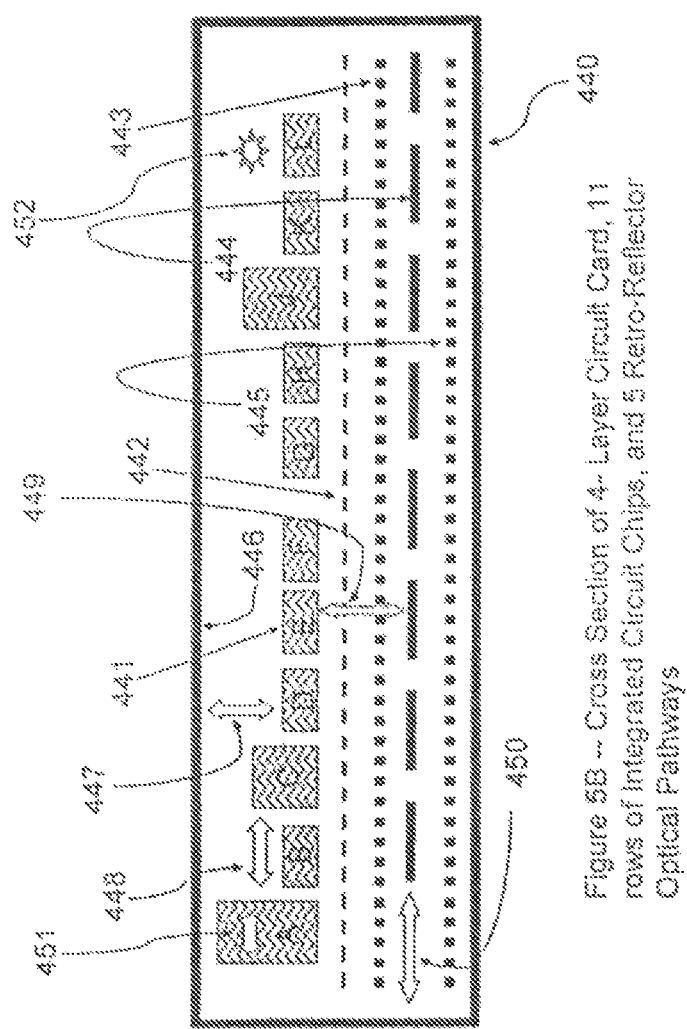
Figure 5B – Cross Section of 4- Layer Circuit Card, 11 rows of Integrated Circuit Chips, and 5 Retro-Reflector Optical Pathways

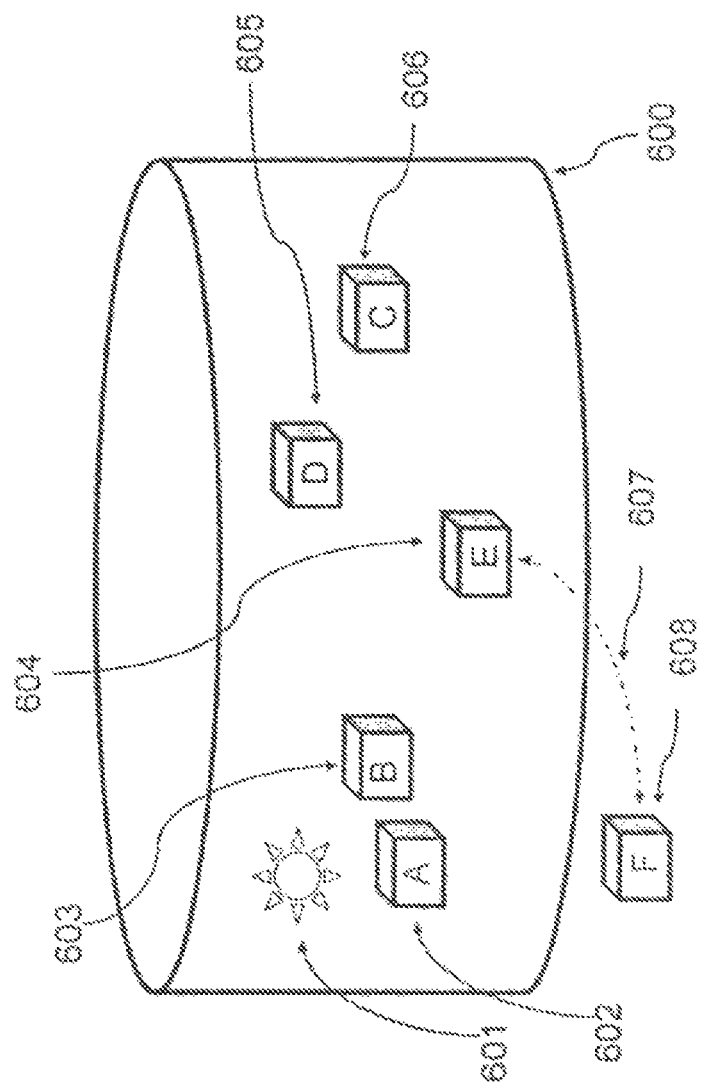
Fig. 6 Optically Transparent Electrically Conductive Medium with Suspended Integrated Circuits with Retro-reflector Communications

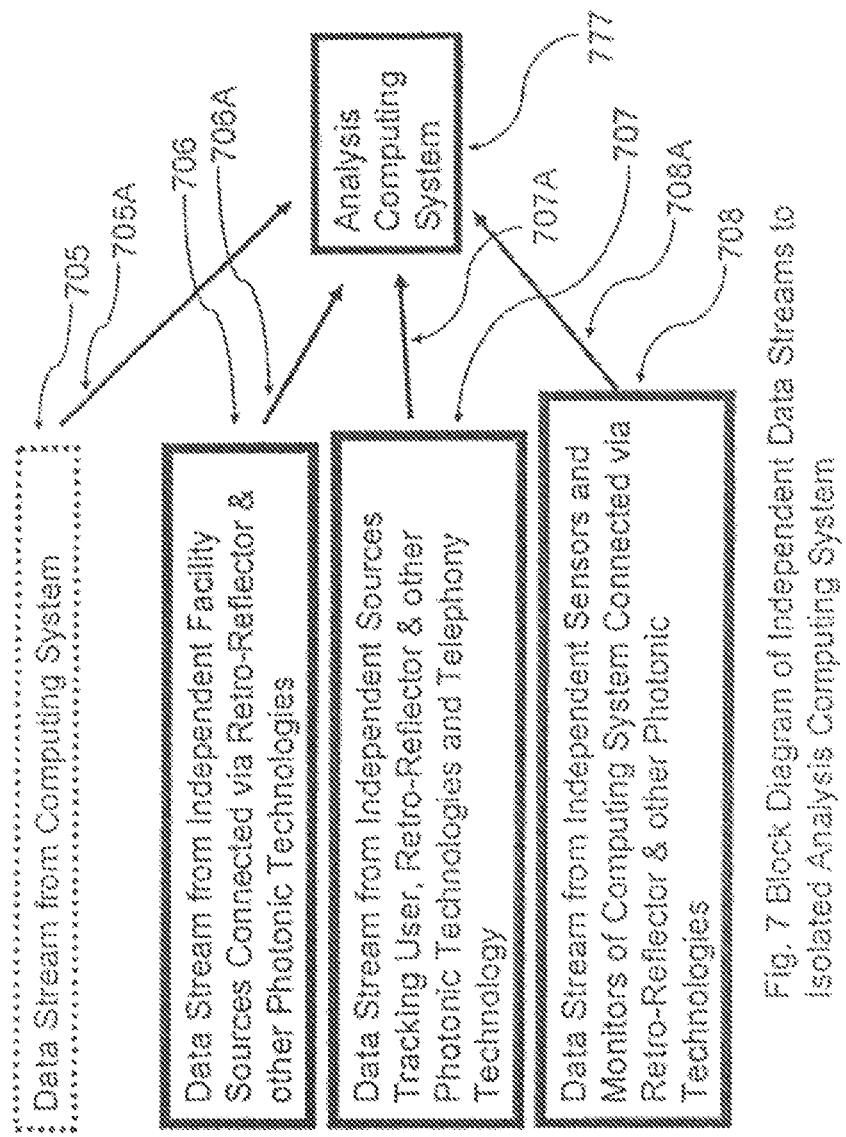
Fig. 7 Block Diagram of Independent Data Streams to Isolated Analysis Computing System

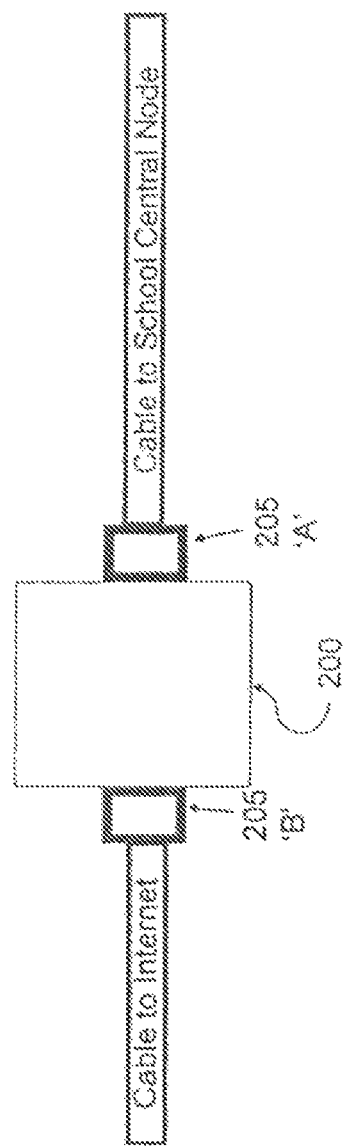

CYBER-RETRO-REFLECTOR TECHNOLOGY

CROSS REFERENCE TO RELATED APPLICATION

The present patent application is based upon and claims the benefit of provisional patent application No. 62/450,791, filed on Jan. 26, 2017.

TECHNICAL FIELD

Methods and Processes for technologies insertions and integration in and with Internet-of-Things products to increase performance and security for the Internet-of-Things and products that make up the Internet-of-Things.

BACKGROUND OF THE INVENTION

The Internet-of-Things (IoT) has grown substantially. Internet Protocol Version 6 (IPv6) has addresses of many orders-of-magnitude larger than IPv4 (4 billion addresses). Application Specific Integrated Circuits (ASICs) become components on a circuit card (circuit board), which are components in a subassembly or electronic box (physical enclosure). As IPv6 was deployed smaller and more capable components became feasible and were available for electronics' designers; therefore, much smaller devices were able to have IPv6 address assignments, including cell phones, laptop computers, and a wide range of personal and business electronics including fax machines and copiers. ASIC technology turned almost all electronics into 'computing systems', as 'computer-on-a-chip' devices were readily produced by ASIC manufacturers. Conceptually each unique ASIC could be addressable. Connecting all these IPv6 nodes is a challenge for the radio-frequency (RF) and wired networks. Standards are the process control mechanisms used in products' connections, mostly Institute of Electrical and Electronic Engineers (IEEE) '802' standards.

The Institute of Electrical and Electronic Engineers Standards Association (IEEE-SA) develops standards for global market inter-operability for a broad range of industries, such as power and energy, biomedical and health care, information technology and robotics, telecommunications and home automation, transportation, nanotechnology, and many others. For this patent the most influential is the '802' series. One of the more recent standards is 802.15.6 ((Wireless Body Area Network (BAN))—(e.g. Bluetooth low energy). As the local RF fields near a person becomes integral to the person's behavior, how a person interacts with personal electronics become more and more significant for product interoperability and security. Interferences between signals are a concern for radio-frequency based systems.

Additional non-standard communications technologies are dominated by visible and near-visible photonic (aka 'light') components, subassemblies, and systems. ASICs have their photonic counterpart, the Application Specific Photonic Integrated Circuit (ASPIC). IEEE '802' wireless and wired networks have their photonic counterparts: on-board optical port, inter-board fiber optic ribbon cables, retro-reflection for short range, point-to-point telescopic nodes for medium-range distances, and fiber optic cables for very long range. Recently, room lighting has moved from incandescent lighting to Light Emitting Diodes (LED), resulting in the potential for LEDs being used as a modulated photonic source for short range due to the fast switching times of LEDs. LED based photonic communications is also known as 'Light Fidelity (LiFI)'.

As the IoT has grown so have the wired and wireless networks to interconnect the IoT. Spectrum usage drove the mandatory conversion of analog television to digital television in the United States of America. Digital systems are more aggressively seeking to be computational devices, at all levels of human interaction. Computational capacity of the world grows every year, and seems to have almost no limit as to what can be built using computer functions, such as central processing units (CPUs), memory, interface portals, etc. An increase in computational capacity means higher performance to solve problems, but unfortunately there is also potentially an increased risk of detrimental incursions such as hacking.

The ease of adopting '802' arts and standards enabled modern electronics. Eventually the very easy interfaces became significant vulnerabilities as value was assigned to misuse of the '802' interfaces. These misuses were for financial gain, simple mischief, and everything in between. The logic of 'securing' the vulnerabilities generated an entire industry in itself: Cyber-Security. However, the vulnerabilities have become permanent fixtures in the Internet-of-Things, no real fix has been established for nefarious cyber-related activities. Three downfalls of the radio-frequency architectures are: (1) the range the signals can travel, (2) omni-directional nature, and (3) penetration through solid objects. When the radio-frequency based architecture was selected these attributes were advantages to be exploited. Radio frequency (RF) is only one means for eavesdropping, cables can be tapped or just monitored for Electro-magnetic emissions.

Attempts have been made to reduce the hacking of RF emitting devices, including credit card sleeves, which degrade the signal emission by RF-blocker jackets. Passports currently have embedded chips which still emit RF signals even when the passport is closed. When the passport is closed there is a decrease in the RF signal emission; however, the information on the passport can still be hacked, penetrated, or compromised. The closed passport is a low-cost mitigation method, but it is only a "stop-gap" method, the information the passport is still vulnerable to interrogation.

Dongles, fob-like devices which provide randomly generated access 'keys' for access into computer systems, have been advertised as 'secure' secondary quasi-identification systems, but the dongles have been successfully attacked by 'sophisticated' hackers and are not actually 'secure'.

Air-Gap mechanical separations, where the system is not physically connected to the outside, are employed by some systems as a physical security technique, but there is no protection provided for 'insider threats' (removal of data from the server by 'administrators', similar to what Edward Snowden did). Air Gap solutions still must address the radio frequency attributes.

Many software-driven hacking events are occurring and being recorded every day. These hacks reside on some hardware component, such as in internal memory or in an ASIC, etc. Current conventional detection practice or logic is to 'read' the input of a download of an external device or the internet/intranet and than perform searches for known signatures of a hack. This process is flawed since only the known hacking attempts are detected and are then blocked for access into the system. New types of hacking are continuously occurring, including 'viruses', and new detection methods for these new hacks then have to be developed. This is a 'serial' cycle of new hacks and then the reaction of new detection methods.

The current hack detection methods are not very effective or successful in detecting all hacking events. One reason is the signature of the hack needs to be 'detectable' and 'readable' for the current method of detection. Hacks are not always immediately 'detectable' since they could be 'dormant' inside the system. Hacks are not always 'readable' since they could be 'disguised' or could be a 'fragment'. Also, malicious code could still be resident after a system is 'purged'. Hackers can falsify a system's internal data wherein the hack signature may not be accurate, the detection is deemed unreliable, and the success for detection of the hacks is greatly reduced.

Hacks may or may not reside inside a specific system. The current practice of interoperability and interconnection of systems means a hack could be resident in one system and then migrate into or within other systems. The potential location(s) of the hack increases with the number of interconnected systems and the percentage for a successful detection of the hack decreases.

Optical links can be made point-to-point (telescopic in nature with small beam divergence angles) or with deliberate optical beam spread the larger angle of field-of-view be defined. Retro-reflectors have been fabricated with nearly hemispherical field-of-view. Classic telescopes are made with small beam divergence to concentrate the light, thus a few micro-radian beam divergence allows a telescope to transmit most of its light power over hundreds of meters to many tens of kilometers with minor losses (10 micro-radian telescope over a 30 kilometer distance results in a spot size of 30 centimeters—one foot). Complex optical transfer functions are involved in generating a bit error rate (BER) but in general the desire is to keep a BER below 1 bit in every one-million. Detector noise and other performance considerations are also important. In retro-reflection one of the most dominant factors is the switching rate for the modulation, nominally device size dependent. Beam divergence is not a significant factor in retro-reflection as the range is small, and by definition the retro-reflection return signal is to the source of the photons.

Photonic intra-chip and inter-chip data transports, micrometer to centimeters, could address radio frequency and electronic self-interference and noise. A chip-to-chip communication design for ASPICs is detailed in U.S. Pat. No. 5,598,452 (Goossen, December 1997). In January 2013 an optical waveguide design was patented (U.S. Pat. No. 8,363,9870 by Saeed Bagheri (assigned to International Business Machines Corp). Later in May 2014 (U.S. Pat. No. 8,724,9340) the same inventor (Saeed Bagheri) and assignee extended their work.

Other patents for photonic integrated circuitry include U.S. Pat. No. 7,052,111 (June 2006) which addresses boosting output signals. Spillane and Beausoleil (U.S. Pat. No. 7,570,849 in August 2009) defined layering techniques for electro-optical sub-layers in a multi-layered integrated circuit. Roel Baets et al (U.S. Pat. No. 8,620,120 in December 2013) describe other methods to use photons in conjunction with electrons in integrated circuitry.

Lovejoy et al (U.S. Pat. No. 5,684,308 in November 1997) patented a photo-receiver formed monolithically on an InP semiconductor.

Farnsworth and Wood assigned their U.S. Pat. No. 6,463, 377 to Micron Technology Inc of Boise, Id. The basic idea is an internal optical fiber network between circuit cards. This technology has some relevance to fiber optic designs at many levels of integration.

U.S. Pat. No. 7,046,869 (May 2006) addresses serial-to-parallel and parallel-to-serial optical circuitry.

Multi-layered optical interconnections are described in U.S. Pat. No. 7,446,334 by Mears et al.

Light guides (waveguides) are described in U.S. Pat. No. 7,994,467 (Fushman et al in August 2011).

Optical fiber ribbon cable technology is explained in U.S. Pat. No. 8,036,500 (McColloch).

Glass fabrication specification is defined in two patents by lead inventor Wolff, in U.S. Pat. No. 8,168,553 (May 2012) and U.S. Pat. No. 8,404,606 (March 2013).

Different technologies are required to extend the range of transmission to tens of meters or even hundreds of meters. LEDs and various optical designs are patented for these longer ranges. Band gap systems across the visible and near visible spectrum have also been patented. Various optical elements have also been placed in the overall pathway to either increase or decrease the beam acceptance angle. Multiple (segmented) strategies are defined for the various designs.

One of the more common optical techniques is retro-reflection. In one search of the USPTO database, looking only at claims, a total of 35 patents were found to have both 'modulate' and 'retro-reflector' somewhere in their claims. Naval Research Laboratory (NRL) prior works are known to the authors of this patent application.

U.S. Pat. No. 8,379,286 (Klotzkin at al) in February 2013 is one of multiple NRL patents using 'multiple quantum well' technology. Various optical designs were employed in these patents, including 'Cat's Eye' optics. This Cat's Eye approach dramatically improves the utility of retro-reflection by removing a critical disadvantage of Free Space Optical Interconnects (FSOI), pointing knowledge of the respective active transmitter and the receiver (in a retro-reflection the 'receiver is actually a passive retro-reflective 'transmitter').

U.S. Pat. No. 8,602,568 (Larsen et al) in December 2013 addresses various techniques for modulation in response to a stimulus.

U.S. Pat. No. 8,228,582 (July 2012) describes retro-reflection using Micro-ElectroMechanical Machines (MEMS), this involves a novel moving parts strategy.

Most of these 35 patents, using the terms 'modulate' and 'retroreflector' in their claims, are not relevant to this application. For example, U.S. Pat. No. 7,623,253 (Freese et al) in November 2009, is a spectral scanner to be used as a laboratory tool.

The terms 'computer' and retroreflector in another USPTO database search of claims resulted in seven (7) found patents. None of these patents appear to be relevant.

Using the terms 'retro' and 'communications' in a USPTO database search resulted in twenty-nine (29) patents having both terms in their claims. Most of these patents are not relevant (such as U.S. Pat. No. 5,749,253).

In U.S. Pat. No. 5,121,242 (1992, now expired) Kennedy defined an optical switch coupled to a corner cube reflector. His optical switch enabled the incoming photons flux to be modulated before it exited the pathway of the corner cube reflector. This is an example of a passive retro-reflector wherein the beam returns with data content impressed upon it.

In part the logic of the '242' patent was to "provide an optical transceiver that does not require sophisticated tracking or pointing apparatus". Other features are low power, compact, lightweight, and portable.

A door locking device is reported in U.S. Pat. No. 5,749,263 (not relevant).

U.S. Pat. No. 7,317,876 by Elliott, describes a scheduling system for retro-reflectors. This patent includes a probe device that acts to interrogate individual retro-reflector devices.

U.S. Pat. No. 7,940,446 (May 2011) is an etalon wherein the modulation is defined by the motion of a voltage driven spring system connected to the reflective surfaces (micro-mirrors in some examples).

U.S. Pat. No. 6,045,230 (Dreyer at al) in April 2000 is a classic example of several of the above-mentioned topics. They describe multiple wavelengths, different fluxes, and the utility for safety of people and automobiles.

U.S. Pat. No. 8,961,955 (March 2015) describes RFID safety in the workplace.

U.S. Pat. No. 9,410,420 (August 2016) patented by Ross et al is a classic technology insertion for oil drilling rigs. In this case the movement to wireless communications is a retrofit, thus satisfying the query in the search engine. This patent is not relevant.

The terms 'cyber' and 'accelerometer' in another USPTO database search (anywhere in the patent language) resulted in two hundred twenty-two (222) patents satisfying the search inquiry. Only one patent U.S. Pat. No. 9,396,437 (Ponomarev et al) had both terms in its claims. U.S. Pat. No. 9,396,437 is for a toy. '437' has no security consideration, it also makes no effort to address any advances from use of optical capabilities. '437' is not relevant to this application.

Additional searches using the key words have been unable to locate a specific patent of any relevance. The six (6) patents found using 'retro' and 'accelerometer' in the claims are all unrelated and are not relevant. These six patents are (1) U.S. Pat. No. 9,377,301; (2) U.S. Pat. No. 9,367,951; (3) U.S. Pat. No. 7,965,147 (4) U.S. Pat. No. 7,538,688; (5) U.S. Pat. No. 7,295,112; (6) U.S. Pat. No. 5,400,143.

U.S. Pat. No. 9,526,006 (Turgeman) defines an acceleration data to be a second source of identification validation. These are typical techniques and the data are NOT reliable since a hacker can alter the internal contents.

Other background materials of potential interest are patents related to RFID protection. U.S. Pat. No. 8,237,549 (August 2012) describes mechanical blocking of the RF signals.

Supercomputing Patents U.S. Pat. No. 9,081,501 (July, 2015) and U.S. Pat. No. 8,954,712 (fill in date) were assigned to International Business Machines (IBM). These patents teach ganging of ASICs and interconnections using electrical and optical channels.

Application for Patent 2015/0195297 A1 defines a system for protecting automobiles from hacking, using an external monitoring tool operating on data from the individual automobile and a collection of automobiles. Reliance on the vehicle's data is not acceptable if the hacker corrupts the data from inside the automobile.

U.S. Pat. No. 9,749,342B1 dated 29 Aug. 2017, with one inventor being an inventor on this application, wherein the detection of a potential hack can be accomplished using multiple highly correlated data sent to an isolated analysis engine via independent and isolated pathways. U.S. Pat. No. 9,749,342B1 claims are specific to 3 or more independent pathways, with one of the pathways being the computing system, such that a decision can be made as to whether or not a hack has occurred. Hacking detection, the ultimate goal of U.S. Pat. No. 9,749,342B1 allows for undefined actions once detection is complete. However, the base architecture under which the detection is defined assumed the hackers nave ad active controls over the computing system even from remote locations.

BRIEF SUMMARY OF THE INVENTION

This invention relates to the method of using C-R-R-T to control interface circuitry. In another embodiment, the invention relates to suing C-R-R-T in the analysis of highly correlated data collected on independent pathways to identify hackers.

This invention describes a method of restricting external Input/Output functionality of a computing system, nominally to and from the Internet, wherein a first device is plugged into an existing interface port of the computing system, installed first device disables all external Input/Output circuitry of the computing system rerouting all external Input/Output functionality of the computing system through the installed first device, all Input/Output of the installed first device are maintained in a disabled state until specifically enable by local user command issued from a second user controlled device after a valid user request of Internet access is received.

This invention also describes a method of identifying anomalous computer system performance, wherein two isolated independent data sets are compared, first data set is generated by the computer system operating system, second data set is generated by passive sensors transmitting their data via free space optical communications inaccessible by the computing system, said passive sensors' data has high correlation to parameters within the first data set, analysis is looking for miscompares.

The C-R-R-T captures ALL photonic transmission mechanisms. The retro-reflection is a placeholder Retro-reflection covers a broad scope in the transmission mechanism. It covers many photonic transmission wavelengths and techniques. However, it excludes photons in portions of the electro-magnetic spectrum known as radio-frequency. R-R covers 'visible and near visible photons including ultra-violet and infrared'. Another means of being descriptive is to cover wavelengths from $10^{-8}$ to $10^{-4}$ meters. Additionally, retro-reflection assumes only one active photon source, thus, it is reflected photons. Classic photonic communication using telescopes, operating in the near visible and visible region of the electromagnetic spectrum, operate using a photon source in each end of the communications pair—thus, no retro-reflection required. There are many commercial products operating as paired communications telescopes. Between telescopes and retro-reflectors are a vast number of photon transmission schemes. It is impractical to list every one. Commercial LiFi, previously mentioned in the background section of the application, uses Light Emitting Diodes (LEDS). Night vision glasses (military is common user) has other technologies. The number of ways to excite a photon generation is limited only by transitions in energy states of atoms, and the combinations and permutations to build the optical lens systems' is very, large! Our key 'take-away' is the isolated, mostly undetectable (thus not hackable) communications pathway. In extreme cases the nefarious intervening and detection of the photonic pathway actually alerts the system of the intrusion. This is absolutely true for detection systems where the number of photons used to communicate is so limited the loss of any photon is known. There are single photon systems, thus the loss of the photon (captured by the intruder trying to intercept the communication), means the intended system is no longer a secret!

With respect to the large number of sensors embedded within computing systems, and the varied names used by the different vendors, and the many ways these sensor data are reported, are of interest to this patent application: large number of sensors that would be of most interest. Within the enclosure of a computer (think laptop) the Operating System checks on a vast array of sensors, typically more than 100 but less than 1,000. Naming all these sensors and measured parameters is very impractical, first the list is long and second the list has different names for the same parameter based upon the designers and manufacturing interest. For example, the temperature sensor on the Central Processing Unit could have similar names between a DELL laptop and an HP laptop. Registers and buffers, and many other names of components can find their way into the sensor naming conventions. Beyond capturing all of these embedded sensor data collected by the computing system this patent application uses data from additional sensors reporting highly correlated independently collected data. These highly correlated independently collected data might be installed by the Original Equipment Manufacturer (OEM) or installed by the consumer or other party. U.S. Pat. No. 9,493,482 list most of the critical sensors and data for internal computing system provided sensors and potential new sensors reporting highly correlated independently collected data.

PCT/US2015/0592903 filed 29 Sep. 2015, herein is incorporated by reference.

U.S. Pat. No. 9,749,342 issued on Aug. 29, 2017, herein is incorporated by reference.

BRIEF SUMMARY OF DRAWINGS

FIG. 1A, USB Compatible I/O Port Control Device—RF type.

FIG. 1B, USB Compatible I/O Port Control Device—Photonic type

FIG. 1C, User worn dongle, Paired Retro-reflector

FIG. 2, Hardline (wired) I/O Port Control Device

FIG. 3, Simplified Hardline (wired) I/O Port Control Device

FIG. 4, Cross Section of 4-Layer Circuit Card & 11 rows of Integrated Circuit Chips FIG. 5A, Cross Section of 4-Layer Circuit Card, 11 rows of Integrated Circuit Chips, & 4 Retro-Reflectors Optical Pathways FIG. 5B, Cross Section of 4-Layer Circuit Card, 11 rows of integrated Circuit Chips, and 5 Retro-Reflector Optical Pathways FIG. 6, Optically Transparent Electrically Conductive Medium with Suspended Integrated Circuits with Retro-reflector Communications FIG. 7, Block Diagram of Independent Data Streams to Isolated Analysis Computing System FIG. 8, shows a gateway connection for the control device of FIG. 2.

DETAILED DESCRIPTION OF THE INVENTION

This patent application merge two unrelated technologies into a vast array of products and capabilities. First technology is an analysis technique of highly correlated data from isolated independent sources, sensors and devices, including data from computing systems. Second technology is visible and near visible photonic communication to supplement and/or replace radio-frequency and/or hard-line conductor communications, reversing the convention of external interfaces always being 'on' to now always being 'off' except upon receipt of a localized optical communication authorizing 'on'. Retro-reflector is used throughout this application as a typical optical communication technique and should be construed as a representative technique and not the only available technique to accomplish the optical communication. The terminology 'retro-reflector' is a physical manifestation, and is associated with visible and near visible wavelengths commonly used in retro-reflection optics. This patent application uses photonic techniques, but specifically excluded radio-frequency techniques wherever the radio frequency techniques can be observed and used to create opportunities for hackers to gain access to systems otherwise not accessible to the hacker when a carrier frequency in the visible or near visible is used. The analysis of highly correlated independent data relies upon unaltered data from sensors and devices to either validate the computing system's data or highlight inconsistencies (potential hacks). Computing system reliability is improved when inconsistencies are found and corrected. The merging of these totally unrelated broad capabilities, inverting the external interface states and correlated data from independent pathways, is the foundational architectural concept defined in this specification. Unlike U.S. Pat. No. 9,749,342B1 this patent presents different architecture states of the computing system upon which to assess whether a hacking event is occurring thus fewer independent pathways can achieve detection. Computing system means any electronic or photonic devices wherein a machine performs computations of any nature: ASICs, ASICs with internal 'computer-on-a-chip' logic, the ASPIC equivalent to ASIC technology, and older style central processing units (CPUs). These computing systems are found in laptops, cell phones, automobiles, home alarm devices, and televisions, to name a few.

As a technology, the photonic communication has potential in the development of integrated circuitry replacing conductors, wires carrying electrons. However, the photonic communications is no better than wired conductors when the devices using the photonic communication are hacked. Wired connections could conceivably be used to convey all the independent data from sensors and devices, but the development cost and complexities will not be competitive with photonic solutions. Radio-frequency (RF) connections, a form of photonic communication, are currently in use and have been successfully hacked.

Analysis tools check for self-consistencies between the computing system telemetry data, nominally collected by the operating system, and other highly correlated independent data collected from the additionally installed sensors/monitors, facilities infrastructure and sensors, and the computing system user. Because of the inverted architecture of the computer's external interfaces states (off most of the time) the number and types of data necessary to assess a hack has occurred, or is occurring, can be substantially less than other hack detection techniques. The analysis engine can be collocated with the sensors/monitors. The detection of an inconsistency suggests a hack has occurred. Computer system data are internal computing system telemetry collected by the base operating system as part of the internal diagnostics. The hacker will usually be able to falsify the internal computing system telemetry so as to mask or make invisible that a hack has occurred. With the inverted always 'off' external interface the capability of the hacker to access and respond to whatever is occurring within the computing system, and specifically to alter the computing system's operating system reporting of status, will fundamentally cease to exist. Therefore, any hacker will have less knowledge of what is being done at the core level of monitoring the computer. Additionally, the hacker is unaware of and unable to access the data from the independent sensors/monitors and other data sources that have been installed. The correlation and corroboration of the independent data collected from these additionally installed sensors/monitors are a novel component of this patent application.

Central Processing Unit (CPU) temperature data are one example of highly correlated independent and isolated data streams. One data stream is from the CPU's internal telemetry (object being inspected) and the other data stream is either from a passive heat detector attached to the CPU's housing or from a remote detector with a field-of-view of the CPU or both. A passive heat detector is similar to a temperature strip on a person's forehead which indicates the person's body temperature. The data from the passive heat detector attached to the CPU's housing is sent to a retro-reflector, which then sends the data to a separate/independent analysis engine (another computing system). Another sensor could be a passive induction measurement of the conductor carrying the power to a circuit, wherein the passive measurement can be converted into a signal for a retro-reflector. If electrons are moving inside the computer circuitry (inside a conductor wire) then these electrons will be detectable by induction, as a matter of classic electromagnetism. Many other sensors can be used to capture an independent measure of some sort or another of a signal nominally collected by the computer's operating system; in these two examples the CPU temperature and a current flow of some circuit were assumed to be nominally collected by the operating system.

The independent an engine compares the CPU temperatures and the electron flows from the two data streams. If the data are nearly identical then a hack may not have occurred. If the data are not identical (are inconsistent) a hack has occurred. The 'may not be a hack' scenario could be an insider working, thus activity is as expected. Insider threats are the only credible threat once the external interface circuitry is inverted to a nominal 'off' state.

The independent data transferred over the Retro-reflector communication link are not observable to the hacker. The data are only seen by the two sides of the retro-reflector link. Since the retro-reflector is not connected in any way to the CPU or to other electronics connected to the CPU the hacker would not know the CPU temperature and current sensing data are being independently collected and sent via the independent data stream to the separate/independent analysis engine. While it is preferred to send all independent data over retro-reflector links this may not always be possible. Data collected from facilities and other existing sources probably already have isolated and independent pathways, some using conventional wired connections.

An 'insider' hacker, an insider working nefariously and with knowledge of the internal system configuration, would not be able to successfully hack the computing systems without detection. Data streams from the independent and isolated data communications are not accessible to the hacker by design and the independent data collected is analyzed in the independent analysis engine also not accessible to a classic insider. Also, the data streams may not be 'visible' in the system's design since the isolated independent pathways' data streams can be incorporated, as additional features, after the manufacture of the computing system by the Original Equipment Manufacturer (OEM).

Other data could be evaluated to provide further confirmation of a hack, including CPU power usage. A rise in CPU temperature is also an indication of an increase in CPU power usage which means a task or function has occurred in the computing system (such as data being extracted, tasks being performed, etc). The CPU power usage is a usual telemetry data point measured for all computing systems. The CPU temperature is also measured as a telemetry data point, but the comparison of the CPU power usage to the CPU temperature can provide another data self-consistency check to determine whether a hack has occurred. The CPU power usage can be monitored as another data stream independent of the computing system's operating processes, by a power meter in the facility. Both power readings are sent to the separate/independent analysis engine and compared to the rise/fall of the CPU temperature, which would confirm whether a hack has or hasn't occurred. The expected rise/fall of the CPU power usage as it relates to the rise/fall of the CPU temperature is computable and measurable for each computing system and the functions performed. The measured CPU power usage can also be compared to the expected CPU power usage for the function that has occurred to determine whether the CPU power usage is consistent with the function that has occurred (or whether there is more power used beyond which is necessary for that function). Consistency means there has been no hack and inconsistency means there has been a hack.

More complex analyses can be accomplished, such as the timing of specific processes within the computing system, which are observable in components' temperatures. If the temperature reporting streams are significantly inconsistent then it is likely the CPU is being misused. If the CPU temperature has increased when no tasks have been ordered or have occurred then this means hacking or nefarious actions have occurred. A higher CPU temperature can mean additional tasking has occurred, such as a file has been imbedded or files have been moved. Again, more detailed analysis will be needed to get a definitive picture of how the CPU is being used. Most importantly, the misuse has been found and can then be further investigated.

Tens to hundreds of data points can be internally monitored (telemetry) by the computing system's operating systems, depending upon the device. Any sophisticated hack will successfully adjust all the internal computing system's telemetry to reflect nominal computing system usage. Therefore, the data from independent sensors and monitors must be sufficiently correlated to the data collected from the computing system to establish when a false trail has been created by a hack of the computing system.

Four data streams are envisioned, but more could be developed, not all are used. The simplest analysis is one independent isolated source compared with the equivalent data provided by the operating system. The four data streams are: (1) the computing system(s), as collected by the operating system of the computing system, and three additional independent data streams from (2) devices/monitoring sensors directly observing the computing system but not part of the computing system, (3) devices/monitoring sensors within the facilities housing the computing system(s), and (4) data on the persons operating the computing system(s) in the facilities. In the previous examples the independent temperature sensor is directly observing the computing system and the power meter is a facility sensor.

The sensors directly observing the computing system can be incorporated as part of the original design, by the OEM, passive and isolated with a communications pathway that is untouchable by the computing system. These sensors can be an after-market add-on such that any observer (potential hacker) can't find out whether or not a particular computing system has any particular augmentation.

Isolation of these four data streams is critical since the hacker can realistically alter any records (data) in the computing system, and the architecture relies upon the hacker not being able to alter the independent and isolated data streams used by the analysis computer to establish self-consistency or inconsistency. An inconsistency in the hacked computing system's performance requires tools to assess nominal expected performance under variable conditions. All these data are used to establish a self-consistency between different sources, where a very high degree of data correlation is known to exist. Most computing systems are assumed to have been hacked in previous usage. Devices/ monitoring sensors and the facilities can be built 'new' and treated as untouched by hackers.

The hacker's burden is enormously more complex when the independent and isolated stream's content is not defined and therefore unknown. Sensors of all sizes and capabilities can be inserted with retro-reflectors as their transmission mode, retro-reflection inserts an Air Gap into the linkage thus limiting the hacker to just the sensor. With proper care the sensor can be totally isolated from the computer. Which sensors, and what level of data from each sensor, can be dynamic. Ever changing content of sensor data is a way to keep false signatures for the computing system from being formulated with high confidence. Power consumption sensors, board-level, critical component level on a board, and basic input to the system are likely candidates for retro-reflection nodes. Light intensity, temperature of the room door and chair movement in the room, keystroke induced vibrations, and other mundane data are additional candidates for retro-reflection nodes. If there is a correlation between the computing system and the environment, then the environment is a potential data source. Different environments for different computing systems will likely result in different sensors for the correlations.

In some cases, the devices' have built-in Global Positioning System (GPS) and in many pieces the GPS signal can be locally 'adjusted' by a jammer or spoofing or simple offset. If the devices' owner has such capability then the hacker would need to be aware of each action with respect to the internal GPS reporting otherwise a false device GPS trail would lack deliberate jamming signatures or spoofing signatures or offset signatures, all which can be part of the real history and data for self-consistency assessment. GPS devices can be the computing system, the sensors/monitors in the facility, a cell phone etc.

Analysis tools can be simple or complex. Simple tools will check for the obvious mismatches; computing system is using power as measured by the independent isolated monitor and the computing system's telemetry indicates it is 'off'. In this case the hacker falsified the computing system telemetry to 'off' (simplistic hacker action) presuming there is no independent sensor/monitoring device, otherwise a competent hacker would have tried to generate a more realistic power profile. A slightly more complex analysis is the external sensor showed CPU heating up when the computing system was reporting the CPU 'idle' and the computing system's operating system reported the CPU at room temperature (effectively 'off' or 'idle'). Very complex analysis tools can adjust for system downloads, a System Manager defined task nominally done when the computing system is idle (at night etc.), and correct for thermal heat up and cool down times between various activities to determine if an additional activity is occurring. Many more complexities can be included, including system-to-system comparisons where a group of similar computing devices are operating on similar tasks.

Change Detection patterns can be developed for nominal activities 'painting a picture' of computing system states, number of processes active, memories status, input and output calls, etc. Simple comparisons are easily done on data sets. An analog is two sheets of paper with nearly identical text written on them and when back illuminated the pages can be shifted relative to each other to quickly find locations where letters may be different on the two pages. Any analysis computer can be programmed to assess and determine simple Change Detection.

Pattern-of-Life processes can be used in the Analysis Computer. Pattern-of-Life self-consistency checks are more complex than Change Detection self-consistency. Other factors or events, with more than simple time relationships, define the expected computing system status. Rules can be established to define acceptable ranges for every operating system reported telemetry point as a function of time and events. For example, ever Wednesday at 2300 hours the System Administrator does a system-wide back-up, however, a power failure event forced the back-up to be delayed by 2 days.

Human-like Reasoning is a significant step up in the capability of the analysis computer. Conditional assessments are made where a logic diagram fails to be able to define what is and is not acceptable telemetry.

Tools of all levels, Change Detection through Pattern-of-Life and Human-like Reasoning, are available for use. Some of these tools are sold commercially, licensed from universities, or are proprietary. Analysis Computer tools are assumed to be available and no further note is made about the analysis tools. The an computing device is a computer, with only this one function.

Inclusions of very small and mail retro-reflection devices support Air Gap modes of operation; where data transfers require the presence of the operator. The required presence of the operator forces the hacker to be within the facility housing the computing system. In this application the 'Air Gap' requirement is satisfied when a pair of mated dongles are within a specific range of each other; one dongle is inserted into a IEEE port (USB for example) of the computing system and the other dongle is under the physical control of the operator of the computing system. The dongle inserted into a IEEE port (USB) is designed to disable all IEEE radio-frequency data transports.

The dongle in FIG. 1A represents a simple optical relay device wherein the nominal IEEE '802' computing system's Input/Output (I/O) ports, RF and wired, are disabled and all data are routed through the dongle. These dongle devices require a retro-reflector enabling signal under the control of the operator. Without the operators dongle, shown in FIG. 1C, the computing system's I/O is disabled as the default from Dongle 1A, therefore no Internet connection to the computing system.

In designs with paired dongles, FIGS. 1A and 1C, or FIGS. 1B and 1C, the hackers must be within the transmission range of the inter-dongle optical link to attack the computing system. Light transmissions are highly directional and easily blocked by walls and other structures, therefore a high degree of security can be achieved. Revamping the logic of input/output ports from 'always on' to 'always off' except when required for an I/O activity is one step in a process. Just to off I/O ports reduces the time periods a hacker can gain entry, but it does not stop hacking.

Additional qualifiers, controls in the logic of the microprocessor inside the Dongle, will limit the external Input/Output ports the ports only open when a valid user keystroke sequence is recognized. In this fashion the user truly must be present and actively requesting Internet access. Calculations of the durations of port access, expectations on the required duration the ports need to be open to service the request etc . . . can be part of the Dongle design requirements.

Besides self-consistency analysis other features of systems can be adjusted by adding retro-reflector technology. Current hacked systems are vulnerable to large data transports from the hacked system. Building Air Gaps in the FIGS. 1A and 1B Dongles Input/Output (I/O) pathways can eliminate large data theft. Data theft is a common threat from hackers. In FIGS. 1A and 1B the First-In First-Out (FIFO) functions can be selected to limit each transaction based upon the expected size of the transaction. For example, a query to the Internet should not send out a massive file.

By monitoring, optically, the requests for external port access inside the computing system via the photonic interface device, FIG. 1B, plugged into the USB port, the user will know a nefarious software tool resident on the computing system is activating the interface, or attempting to activate the interface (reversing the dongle control process that disabled the computing system '802' functions). The hacker might get access depending upon how fast the USB port reverses the interface 'on' state activated by the hacker's nefarious software tool. But the user will know the access was demanded—at which point the computing system's user can opt to shut down the interface or correct the code engaged in nefarious behavior.

Coding a Retro-Reflector's response with a non-biological or biometric tag is another layer of secure identification. Adding a requirement for more than one user worn dongle verification is yet another security feature possible with these dongles. Initial coding of a pattern or identification code or other bit sequence onto a retro-reflector is much like settings on any other electronics, a user interface allows initialization. Architecturally two retro-reflector initiations will be done in pairs; one half of the pair, FIG. 1A or 1B, is connected to the computing system, inserted into its IEEE defined standard interface, and the second retro-reflector part of the pair, FIG. 1C, is kept by the user. Dongle in FIG. 1A communications with the Dongle 1C port '304' via the 'on', 105, and 'off', 106. Dongle in FIG. 1B communications with the Dongle 1C port '304' via the 'on', 115, and 'off', 116.

Biomarker monitoring systems can be selected as an activation code, highly personal. Unlike a fingerprint code stored on the computing system these data never are stored on the computing system, and can't be accessed by the computing system.

A Dongle inserted into a USB port on a laptop computer can transmit the data via another retro-reflector; FIG. 1B, 111B. This UBS-compatible dongle is designed to disable the '802' interfaces, and route all I/O data interfaces through the retro-reflector on the dongle. This dongle will communicate with the local router optically. Dongle designs will have lots of specific options; powering from batteries or external power sources, wired or wireless insertion into the IEEE processes, internally provided as newer computer designs incorporate the feature into machines, and others.

User's dongle, FIG. 1C, can be almost any personal object with an exterior surface mounted identification retro-reflector. For example, the user's dongle could be a retro-reflector with the user's coded identification, on a ring, eye glasses, jewelry, car key, or cell phone etc. The range of the Dongle's retro-reflection can be very short (centimeters), and not obvious to anyone else, even in public places. The highly directional nature of the retro-reflector makes it very impractical for any random search to find the correct Line-of-Sight and frequency and code to cause a response. Another way to build these User Dongles would be to have them be covers to fit over the USB inserted Dongle. The goal of the Dongles mating is to allow access, so they must be easy to use, and not a threat if misplaced or lost. User Dongle can be a passive device using ambient light. The power for the micro-circuitry in a User Dongle can be supplied by motion of the human. Many light sources can be used, as can many power sources.

Dongles can also be used to transmit internal status data from the computing system's operating systems: CPU usage, number of programs active, memory activities, and internal data stores, etc. Laptops might have up to several hundred internal status data (telemetry), whereas an automobile might have 10 times as many computing systems.

Similar Dongle units can be installed on IoT devices, each needing to be compliant with the specific wireless or wired interface.

Dongles are easy to install as after-market augmentations to IoT devices. The dongles will need a connector interface; USB connectors are just one type in the IEEE standards.

Dongles can have time limits, to prevent an unskilled or undisciplined user from leaving a computing system on the Internet for excessive periods of time. Master Dongles can be programmed in more demanding environments such as a System's Administrator or as a form of Parental Control.

Retro-reflection has enormous capacity for integration into systems where no initial communications system was intended. These opportunities are found at the integrated circuit (IC) level, and grow to 'last mile' solutions. While adding ports for additional communications seems counterintuitive (more ports for intrusions) the exact opposite effect can be achieved.

Retro-reflection can be deliberately short range, at the intra-integrated circuit the range can be millimeters or centimeters. Intra-circuit card or the electronic enclosure communications can be a fraction of a meter in distance. Coupled devices have ranges from meters to many tens of meter, television infrared remote control devices for control are in these ranges.

By their very nature short range highly directional beam photonic signals can be hidden from view. Hidden has several meanings, the obvious being the lack of detection, another is the lack of knowledge of the details of the connection even if the connection is known to exist. The fact that someone is aware of an optical link being used does not automatically mean they can intercept and use the link in a nefarious way. Most home televisions use wireless infrared, but having that knowledge does not allow the neighbors to discover the signal to know what channels are selected, or when selections are made. Unlike a radio-frequency link where the link generates many potential listening opportunities the photonic link requires the intercept to be in the line-of-sight (walls block the optical signals), and intrusion into an optical link is detectable to the original ends of the communications link.

Additionally, the optical link routing can be adjusted either in frequency of the light, or the actual physical route is changed with a new connection allowed by the vast geometry diversity available in the photonic regime that is lacking in the radio-frequency regime. These many link options effectively expand connectivity as more systems can be accommodated simultaneously. Directionality keeps stray energy from impacting a non-coincidental beam. RF energy is omni-directional.

A 'common photon source' can be used by paired retro-reflector devices, utilizing photons from a single light source within the enclosure eliminates the added complexity of individual photon source for each retro-reflector pair. FIGS. 5A and 5B have this feature.

Placing retro-reflective surfaces into any integrated circuits (ICs) can be simple if the design starts with the logic circuits including a photonic pathway. Retro-reflective coating can be layered into the multi-layer designs of complex masks for individual ICs. These retro-reflective pathways can be integral to the IC operations or can be used as test pathways.

At microscopic dimensions retro-reflection techniques support gigabit per second data transfers over short distances. When spatial and frequency multiplexing are included the rates can be much higher. More importantly, the transmission security is absolute if the enclosure is 'light tight'.

Optical waveguides in ASPIC can be replaced with retro-reflectors. The switching rate (data rate) equation for the NRL retro-reflector design expands enormously due to the low capacitance of the very small surface area of a retro-reflector inside an IC device. Modern fabrication makes it possible to design these small capacitive surfaces into ICs. Equally important the small signal strength means the beam's utility for communication has limited range.

Unlike electrons flowing within the IC photons can move without a conductor. Electrical flow produces electro-magnetic emissions, commonly called Electromagnet Interference (EMI). Photonic flows do not have a similar negative impact. Photons conceptually are more useful, but there is limited experience in mass production.

Data within an IC could be moved using photons. Retro-reflectors would be at predefined locations within the IC layout. Light source can be self-contained in the IC enclosure. IC gates would be connected to the retro-reflectors replacing ASPIC waveguides or replacing electron conductors in ASIC. In the three-dimensional (3-D) model of any IC the composite could be a simple rectangular form with missing materials to create 'channels' (akin to electron conductors or waveguides), each end of the channels would have a retro-reflector. Retro-reflection is easier than forming an electron conductor (material is required).

Retro-reflection connections would be simple point-to-point but some could be deliberately made with a larger beam divergence angle allowing multiple receivers. Cat's Eye designs are able to service multiple nodes. Interior surfaces of the IC enclosure can be retro-reflector surfaces. Enclosure connections to ICs are novel, no waveguide uses the interior surface of the encasing enclosure, and no electron conductors are connected to the interior surface of the enclosure. The extension of the retro-reflection signal paths to the IC enclosure is just one of several options available outside the volume of the active materials of the IC; signals can be from an IC to the board upon which the IC is mounted, or to any Line-of-Sight surface. Line of Sight surfaces can be the inner surface of the box housing the stack of circuit cards, or in an extreme case the surface can be outside the electronics enclosure if a hole or window is provided from the IC to the surface in question.

Pixels within a single retro-reflector are also known art, but not at the scale of the IC's layout. Likewise, Cat's Eye lens also have not been considered at the IC level. The Cat's eye is an ideal candidate for the interior surface of the IC enclosure. Cat's eye retro-reflectors have the potential to be accessed by multiple highly direction retro-reflectors. Each highly directional beam is unaware of the other beams interacting with the Cat's Eye retro-reflector. Effectively the Cat's Eye is a multiplexer device.

Likewise, the photons for all the data signals can be provided by an illumination source built into the interior surface of the enclosure of the IC. At even higher levels of assembly the photons can be provided by an illumination source not part of the IC but of the larger encasement of many ICs (a circuit card or even the box hosting the circuit cards).

This application defines a series of graduations of photonic data transport intra-IC, inter-ICs, intra-circuit card, inter-circuit cards, intra-circuit card enclosure, and inter-circuit cards to enclosures, with and without individual photonic source (light providing the photons). Additionally, individual ICs may directly communicate to the enclosure, skipping the circuit card interface.

Once data are photonic the power leads are the only conductors needed at the IC, circuit card, and enclosure level of integration. Multi-layer circuit card (board) wherein data transports and power distribution drive the need for the layer structures would be unnecessary.

Electrical power could be supplied to ICs in an electrically conductive medium, no hard mounting required. Recovery or replacement of ICs and upgrades are more practical since boards, wiring, harnesses, soldering etc are no longer part of the integration task necessary to make a completed system. An electrically conductive 'gel' with optically transparent at the wavelengths for photonic circuitry communications has the potential to become a new form factor for advances in computing systems. A series of ganged containers full of ICs (or ASPICs) could allow for larger and larger computing systems. FIG. 6 is a container, 600, filled with a medium which has various ICs suspended in the medium.

IC layouts can be of any topology—a 'skyline effect'. Towers of data transport can be interconnected by the higher-level masks having little material, skyscrapers so to speak. This is shown in FIGS. 5A and 5B.

In addition to sky-line type retro-reflection there are edges capable of being used to convey data from IC to IC, at higher levels of assembly from circuit card to circuit card, or IC to enclosure, etc. Edge effect communications are highly commercialized in the display industries mostly televisions (making them thinner).

At higher levels of assembly retro-reflection can be incorporated with ease. Signals carried in electrical traces in multi-layer cards (sometimes called circuit cards or circuit boards) can be frequency shifted into optical wavelengths. At the external interface of the electronic box connectors can be shifted to optical frequencies.

When Circuit Cards are relieved of data transport their designs will simplify to be support structures for power lines. However, the physical layout of data may still use the cards as a place to route retro-reflector signals.

Homes, Offices, or Schools are practically overrun with IoT devices with computing system capability. Inserting devices, like those shown in FIGS. 1 (A, B and C), 2, 3, and performing checks on their computing systems' telemetry, as shown in FIG. 7, will reduce hacking. This will not stop the hacking, but it will make it harder for the hackers, and identification of anomalous computing system performance will be discovered more easily.

FIG. 7, Block Diagram of Independent Data Streams to Isolated Analysis Computing System, reflects the isolated nature of the sensor/monitors, telephony, and the computing systems from each other. The one-way arrows leading from the data sources to the Analysis Computing System are critical to ensure isolation. Then no leakage is allowed between the data sources.

Gateways, where all I/O occurs, can be constructed for almost any defined perimeters of a facility with computing activity; the perimeter could be a single home, a neighborhood, or an office building or school. Each Gateway acts as the interface to the outside world interfaces. For example a cable provider can be the Gateway for a school. The cable provider has a single cable connected to a Gateway at the school, FIG. 8. Within the school all electronics are connected to the School's Intranet using dongles, forming a client relationship with the Gateway. Client devices would use optical transports, connected via a device like FIG. 1B. Internet I/O requests from any client must be handled by the Gateway. This Gateway client relationship has several obvious advantages, first the data ports (I/O) on any client or client computing system only opens within the individual client or client computing system at their request, second the size of files moving are limited to what the Gateway defines, and lastly it will force hackers to be always at the ready to enter when a Gateway grants access. Hackers will need to be looking for a Gateway request into a client or client computing system. Every attempt by the hacker to query will alert the Gateway something or someone is making inquiries even when the computing system is not looking for an input.

The Gateway's telemetry is a data source to be serviced by the analysis processes, in a separate analysis engine.

By forcing all IEEE I/O devices 'off' and using an Intranet Client (either as a thin client or full computing system acting as a client) to a Gateway restricts the opportunities for hackers to get into the Home, Office or School computing systems. While the Intranet is expanding the Internet access into local computing systems is collapsing. The conventional understanding of a Thin Client, wherein the full computational resources are not at every node, but accessible to the nodes, is being used in this context. The term Home, Office, or School, is a placeholder for fixed computing facilities, and does not intend to restrict this patent application to just a specifically named building.

Hackers will be forced to choose between detection in the Line-of-Sight or be shut out at the Gateway, waiting to get a lucky break when a computing system request matches up with their continued inquiries. Note the access to a Gateway computing system is just the first hurdle, the output port of the computing system needs to be opened before the hacker gets any data from the computing system. If the analysis engine is working the event that allowed access to the computing system will be identified and corrected before any harm to the computing system occurs. If the hacker is installing nefarious code into the computer system then the analysis engine will need to find the code and remove it.

Home, Office and School IoT computing system devices are represented by laptops, cell phones, televisions, gaming systems, camera, and a large array of commercial products in the kitchen and office spaces. For each legacy (backward compatible) IoT wired or wireless interface portal this patent application's states several common features including, a matched, dongle for each user and device, and a home analysis computer to download critical monitoring data (optically).

The analysis computer is the host of the analysis engine. Within the home, office or school there will be sensors and monitors to provide the isolated and independent data necessary to perform the self-consistency validation of the computing system(s) telemetry. Users' locations should be near the computing system when the computing system's telemetry indicates use (otherwise someone other than an authorized user is using the computing systems—aka a hacker). Sensors for lighting, chair movement, etc., as well as external vibration due to key stroke activity can be placed near the computing system. Dongle triggers are also validation data.

Some home owners (offices and schools probably will be self-contained) may opt out of performing a local (in the home) analysis of computing system use, in those cases a service provider can be contracted. The same types of isolated and independent data will be required to perform a meaningful analysis of computer system use. To maintain the degree of isolation of these independent data isolated data pathways will be required. Telephony is one pathway and works for the cell phone based data and potential user location data if the GPS is active, another pathways is the wired network from a cable service, another pathway is highly desired. All of these can be accomplished in the home, office or school with retro-reflector limited range systems without risk of compromising the data. This Service provider will need to isolate the data transports.

Within the home, office or school perimeters the retro-reflector data are secure. First, retro-reflection is done with as low as possible power to ensure the data does not escape the boundary of the interior walls, and secondly the retro-reflector beams are narrow and for the most part not known except by the individual who set up the signal pathways.

Home, office and school Intranets are easy to establish for 'fixed' IoT objects, but will require considerations for IoT devices that are carried beyond the perimeter.

Cell phones and truly portable computing are likely to leave the home, office or school. Cell phones have IEEE '802' ports. A cell phone and some other computing devices have telephony persistence. To address the telephony persistence within a facility using a Gateway a simple Thin Client is proposed, it would block direct access to the cell phone momentarily until a link is established via the local Gateway router using a retro-reflector connection to the cell phone. In this Thin Client mode the cell phone (a computing system) will have an IEEE '802' signal blocking port device inserted. At that moment the cell phone is only active via the proxy in the Gateway-based facility. Each cell phone nominally 'attached' to a resident of the home, office or school will have a paired proxy generated. The local proxy service will continue to have telephony connectivity whenever it receives confirmation the cell phone is placed into an optical transceiver mode. Many simple Cell-Phone Thin Client interface designs are adoptable from existing RF inhibiting concepts, like the credit card sleeve wherein the signal loss is sufficient to stop the phone from being recognized by the telephony persistence.

For the periods of time when a portable device is not in Thin Client mode other data will be used in the analysis engine to check for content on the portable device (cell phone, camera, laptop etc.). Other data includes cell phone GPS, call records etc.

Intranet connectivity within the Home, Office or School never reaches the Internet. Specific addresses of intranet nodes are always isolated. The teacher's computing system, acting as a Thin Client to the Gateway, may act as the Intranet server in a classroom. All students are clients to the teacher's node. While a student may have a personal computing system it must have a dongle to inhibit I/O port activity if there is any connection to the School's Intranet.

Meanwhile at home the intranet of the school is extended to specific addresses for each student and parent, when using a thin client.

Retro-reflection inside an enclosure with controlled characteristics of the air has a definite advantage over a retro reflector device beaming through rain, snow, smoke, dust, or fog. Many classic environmental issues of point-to-point telescopic laser communications have no relevance in the designs proposed in this patent application. Many Radio Frequency advocates, from industry to government organizations, dismiss local optical communications based upon system availability; dominated by weather. Link losses associated with those atmospheric attenuation performance factors are eliminated from consideration for this patent application.

Our mitigations to weather effects for the automobile market are: (1) limit the required range and (2) boost power.

Automobiles have all the features of a home Internet and telephony Blocking all the RF systems from sending signals inside an automobile is probably not practical; however, blocking the signals from being accepted into the processing units might be possible. The same logic of shutting down the I/O ports on a fixed computing system, home, office or school, applies to a mobile computing system. Some of the conveniences, such as low tire air pressure warnings, will need to be moved to a 'collection' system not directly connected to the computing systems. Remote door look and unlock can be shifted to the internal lighting system, using a retro-reflector with a Cat's Eye to accept a larger angle of a photon beam.

Automobiles offer new system consideration, significant retro-reflector infrastructure exists for lane markers and signage. Automobiles themselves have extensive retro-reflective surfaces. LEDs are also found in automobiles.

Various connectors in most automobiles sold in the last 10-15 years are available for a 'USB-like' after-market device. Lighting fixtures, inside the human compartment, and on the front, sides, and rear of every vehicle offer a wide range of signaling pathways.

One most intriguing motivation for the automobile to be a target is the vastness of the population and the density of signals, and inherently capable processors left idle most of the time. Super-computer resource potential is on the major roadways in every large city on the planet! Securing the automobile interfaces, to protect against hacking, also enables the same systems to be engaged in a greater good service by offering unused CPU to a ganged Crowd Source. Building an INTRANET of optical nodes, mobile and fixed, is potentially doable. There is no INTERNET connectivity, just elements of the Intranet communicating bits of data to each other as complex problems are broken down into smaller calculations.

Under-utilized automobile capabilities extend into the infrastructures nominally required to support automobiles, the infrastructures of traffic lights and lighting systems for roads.

Once retro-reflector technology and ganged computational systems are adopted by the automobile providers then additional functions can be added to automobiles. Collision controls will be obvious, the cars' computers are interconnected, as a mobile INTRANET. Supplemental support from one vehicle to another vehicle having a 'computer' malfunction can be offered.

Road management, traffic and hazardous conditions warnings are future uses of a retro-reflector communication system. For example, a series of road signs alert authorities and nearby automobiles when fog causes a lower intensity signal from adjacent signage. Many other safety functions can be proposed.

Self-driving automobiles will benefit from the technology insertions as they currently are individual vehicles forced to decide for themselves just as individual drivers are forced to decide for themselves. With additional data the self-driving automobiles will be a better machine.

Potential architectural consequences of using photonic controls over the I/O are improving connectivity, operability, functionality, and increase opportunities for development of super-computing, and better hacker detection. Depending upon how the specific changes are commercialized will define the timeline of when a new capability is available for consumers.

Incorporation of FSOI technology into the production line of ASICs ASPICs will require a financial motive to the manufacturing organizations, nominally driven by a market demand. Supercomputing is a demand market, but on a small quantity level; reference the IBM patents. IBM specifically noted no more than two electrical connects and one optical connection. This limitation is driven by time which is measured in physical distance the electrons and photons travel in a conductor.

In one embodiment, the first device electronics electrically and logically connected to the computing system include; processing control logic and data management, memory overwrite including a pseudo-random First-In First Out buffer, and a highly localized device enable optical signal port to receive an optical enable signal from a second user controlled device. The device electronics electrically and logically connect to the external Input/Output interface, nominally the Internet, include; data management, memory overwrite including a pseudo-random First-in First Out buffer, and a highly localized device enable optical signal port to receive an optical enable signal from a second user controlled device. The distance between the first device and the second device is less than 20 feet. Preferably, different values, less than 1 foot, between 1 and 5 feet, between 3 and 20 feet. "Less than" means "greater than" zero feet.

Another embodiment is a method of restricting external Input/Output functionality of a computing system, nominally to and from the Internet, wherein a first device is plugged into an existing interface port of the computing system, installed first device disables all external Input/Output circuitry of the computing system, rerouting all external Input/Output functionality of the computing system through the installed first device, all Input/Output of the installed first device are maintained in a disabled state until specifically enable by local user command issued from a second user controlled device after a valid user request of Internet access is received.

Highly localized free space optical communication transport occurs within the installed first device bridging an Air Gap within the first device to facilitate physical and logical isolation between electronic components of the computing system and the external Input/Output interface, nominally the Internet, to be connected to the computing system.

The first device electronics electrically logically connected to the computing system includes: processing control logic and data management, memory overwrite including a pseudo-random First-in First Out buffer, and a highly localized device enable optical signal port to receive an optical enable signal from a second user controlled device, and the device electronics electrically and logically connected to the external Input/Output interface, nominally the Internet, include; data management, memory overwrite including a pseudo-random First-in First Out buffer, and a highly localized device enable optical signal port to receive an optical enable signal from a second user controlled device.

The free space optical communications transport is selected to be compatible with the computing system data transport rates to and from the Internet, selected from the following types; two passive nodes using ambient light as their photon source, one active node providing photons and one passive node using photons from a photon source, and two active nodes wherein all photons are supplied by the active nodes.

The free space optical communications transport is selected to be compatible with the computing system data transport rates to and from the Internet, selected from the following types; two passive nodes using ambient light as their photon source, one active node providing photons and one passive node using photons from a photon source, and two active nodes wherein all photons are supplied by the active nodes. The external Input/Output functionality of a computing system, nominally to and from the Internet, when the Input/Output functionality is nominally disabled by design, via a user controlled device after a valid user request of Internet access is received. The enabling user controlled device uses a highly localized free space optical communication.

Another embodiment is a method of restricting external Input/Output functionality of a computing system, nominally to and from the Internet, wherein a first device is plugged into an existing interface port of the computing system, installed first device disables all external Input/Output circuitry of the computing system rerouting all external Input/Output functionality of the computing system through the installed first device, all Input/Output of the installed first device are maintained in a disabled state until specifically enable by local user command issued from multiple user controlled devices after a valid user request of Internet access is received.

The method of enabling the external Input/Output functionality of a computing system, nominally to and from the Internet, when the Input/Output functionality is nominally disabled by design, via multiple user controlled devices after a valid user request of Internet access is received. User controlled devices have attributes selected from the following: biomarkers, codes, embedded in user worn objects, limited beam divergence, cat-eye beam divergence.

Another embodiment is a method of building components, assemblies, and integration of components wherein dongle-like short range free space optical communications enable secure pathways and enhances performance.

The dongle-like free space optical communications is selected between combinations of the following; subassemblies on an integrated chip, integrated chips, circuit cards, and enclosures. The enclosures house an electrically conductive optically transparent medium at the wavelength of the free space optical communications carrier frequency, powering the chips and circuit cards, communicating outside the enclosure via a portal.

Another embodiment is a method of identifying anomalous computer system performance, wherein two isolated independent data sets are compared, first data set is generated by the computer system operating system, second data set is generated by passive sensors transmitting their data via free space optical communications inaccessible by the computing system, said passive sensors' data has high correlation to parameters within the first data set, analysis is looking for miscompares.

More sophisticated issues need to be addressed with biomedical support features like hearing aids, the interfaces have complex approval processes with long time constants. Life supporting equipment like pacemakers need to be addressed as soon as an option is defined by a vendor.

DETAIL OF FIGURES

FIG. 1A, USB Compatible I/O Port Control Device, 101 is a high-level block diagram of the dongle used in any USB port on a computing system. Items in FIG. 1 with an 'A' suffices (101A, 102A, 103A, and 104A) are on the computing system side of the Air Gap, and all suffice 'B' (101B, 102B, 103B, and 104B) are on the external I/O side of the Air Gap. The Air Gap is the physical space between the two retro-reflectors, RR 'A', 103A, and RR 'B', 103B. When a user hits the keys that would activate the computing system's external I/O function (IEEE '802' function) the data are routed to the dongle inserted into a USB port.

The first function of this USB Compatible I/O Port Control Device, 101, hereafter referred to as a Dongle, after insertion into the USB port on the computing system, is to turn the computing system's external I/O ports off and route all external I/O activities to the Dongle, completed upon insertion into the computing system's USB port with the computing system 'on'. Specific circuitry to implement I/O port control by the Dongle (in the USB port) is defined to be in the Pattern Generator & Control Device 'A', 104A. The USB inserted Dongle's optical connection with the user is through the mating of the user's dongle, FIG. 1C, signals for input 'on', 105, and for Output 'on', 106 are provided by the user's dongle.

Dongle side 'A' isolation from side 'B' is essential. The Air Gap is physical, there are no electronics connections between any 'A' and 'B' labeled components'. 'A' side components only interact with other 'A' electronics, and 'B' side components only interact with other 'B' electronics. This isolation means some duplication of internal functions will be required to maintain the isolation between the retro-reflectors RR 'A' and RR 'B', 103A and 103B, respectfully.

'802' Device 'A', 101A, is where the data enters the dongle. For this example, the user's intended action was a wireless external I/O so the term '802' is used to reflect the intent. '802' Device 'A', 101A, will shift data into FIFO 'A', 102A. Prior data in the FIFO 'A', 102A, has been overwritten by the Pattern Generator & Control Device 'A', 104A, preferably with a pseudo-random pattern. FIFO 'A' data are ported via retro-reflector 'A' (RR 'A'), 103A, to retro-reflector 'B' (RR 'B'), 103B, jumping an Air Gap; a security measure. Retro-reflector 'B', 103B, sends the data to FIFO 'B', 102B, and then onto '802' Device 'B', 101B for delivery to the local router to continue the wireless transport. After the data are moved from FIFO 'B', 102B, to '802' Device 'B', 101B then Pattern Generator & Control Device 'B', 104B, will overwrite the FIFO 'B', 102B, contents.

FIG. 1B is identical to FIG. 1A with one exception, the '802' function, 101B, in FIG. 1A is replaced with a retro-reflector device called Retro Device 'B', 111B.

'802' Device 'A', 111A, is where the data enters the dongle. For this example, the user's intended action was a wireless external I/O so the term '802' is used to reflect the intent. '802' Device 'A', 111A, will shift data into FIFO 'A', 112A. Prior data in the FIFO 'A', 112A, has been overwritten by the Pattern Generator & Control Device 'A', 114A, preferably with a pseudo-random pattern. FIFO 'A' data are ported via retro-reflector (RR 'A'), 113A, to retro-reflector 'B'(RR 'B'), 113B, jumping an Air Gap; a security measure. Retro-reflector 'B', 113B, sends the data to FIFO 'B', 112B, and then onto Retro Device 'B', 111B for delivery to the local router to continue the wireless transport. After the data are moved from FIFO 'B', 112B, to Retro Device 'B', 111B then Pattern Generator & Control Device 'B', 114B, will overwrite the FIFO 'B', 112B, contents.

FIG. 1C is the User worn Dongle, the paired item for either items defined in FIGS. 1A and 1B. FIG. 1C Dongle, 300, has three components. The attachment node, 302, is purely a mechanical attach point. The Dongle, 300, may not need an attach point, for example if worn as a ring on a finger the attach point is not required. Carried as a card, a credit card in a wallet is another form factor not needing an attachment node. Body, 306, houses all the support electronics for the retro-reflector functions, including any 'keying data' that specifically identifies this half of the pair. Retro-reflector surface, 304, is the active photon surface.

FIG. 2 Hardline (wired) I/O Port Control Device, is a hardline equivalent to the objects defined by FIG. 1A and FIG. 1B.

'802' Device 'A', 201A, is where the data enters the dongle. Via the wired connector 205 'A'. For this example, the user's intended action was a wired external I/O so the term '802' is used to reflect the intent. '802' Device 'A', 201A, will shift data into FIFO 202A. Prior data in the FIFO 'A', 202A, has been overwritten by the Pattern Generator & Control Device 'A', 204A, preferably with a pseudo-random pattern. FIFO 'A' data are ported via retro-reflector 'A' (RR 'A'), 203A, to retro-reflector 'B' (RR 'B'), 203B, jumping an Air Gap; a security measure. Retro-reflector 'B', 203B, sends the data to FIFO 'B', 202B, and then onto '802' Device 'B', 201B for delivery to the local router, via 205 'B', to continue the wired external I/O transport. After the data are moved from FIFO 'B', 202B, to '802' Device 'B', 201B then Pattern Generator & Control Device 'B', 204B, will overwrite the FIFO 'B', 202B, contents.

FIG. 3 Simplified Hardline (wired) I/O Port Control Device is shown where the cable from the Internet to the Computer has been broken to allow for the object 200 to be inserted. Object 200 of FIG. 3 represents all the functionality of the Object 200 of FIG. 2. In this simply diagram it becomes less complex as to what the wire is made of; copper or fiber optic glass. Like other cables and attachments to cables there will be niche devices for each conductor type.

FIG. 4 shows a cut away view of a 4 layer circuit card enclosure, 400, with an inner surface, 406, with a number of integrated Circuit Chips, 401, mounted on a four layer board where the 'top layer', 402, and bottom layer, 405, have two intermediate layers, 403 and 404. This cut away is a classic view. The layers, 402, 403, 404, and 405 are interconnected with electrically conductive pathways. The ICs, 401, could number in the many tens to over one hundred, depending on their size and board dimensions. These ICs rows are labeled with letters 'A' through 'L'(letter 'I' is not used)—row labels are carried forward in other figures with ICs on Circuit Cards. All data pathways are electrical, no cables or connectors are shown in this view.

FIG. 5A shows another four layer circuit card in an enclosure, 420, the upper-most layer of the circuit card, 422 and a lower-most layer, 425, and two intermediate layers, 423 and 424. Mounted on the circuit card are ICs, 421 (letters A, B, C, D, E, F, G, H, J, K, L). Enclosure, 420, has an inner surface, 426. Four retro-reflector pathways are shown. The retro-reflector pathway between an IC letter 'H', 421, and the inner surface of the enclosure, 426, is shown as the double ended arrow, 427, this is referred to as an IC-to-Enclosure optical connection. Retro-reflector pathway, 428, between IC 'J' and IC 'L' is defined as an Inter-Integrated Circuits optical connection. Optical pathway '429' between the IC 'J' and the Circuit Card layer '423' is an IC-to-Circuit Card optical connection. On Circuit Card, 424, has an optical connection with the inner surface of the enclosure, 426, this is a Circuit Card-to-Enclosure optical pathway, 430. Two (2) light sources, 431, are shown in the corners of the enclosure, these light sources provide the photons used in the retro-reflection communications; double ended arrows connote the bi-directional nature of retro-reflection.

FIG. 5B shows another example of all the features defined in FIG. 5A, plus one additional feature, 451, which is an intra-integrated circuit optical pathway.

FIG. 5B shows another four layer circuit card in an enclosure, 440, the upper-most layer of the circuit card, 442 and a lower-most layer, 445, and two intermediate layers, 443 and 444. Mounted on the circuit card are ICs, 441 (letters A, B, C, D, E, F, G, H, K, L). Enclosure, 440, has an inner surface, 446. Five retro-reflector pathways are shown. The retro-reflector pathway between an IC letter 'D', 441, and the inner surface of the enclosure, 446, is shown as the double ended arrow, 447, this is referred to as an IC-to-Enclosure optical connection. Retro-reflector pathway, 448, between IC 'A' and IC 'C' is defined as an Inter-Integrated Circuits optical connection. Optical pathway '449' between the IC 'E' and the Circuit card layer '443' is an IC-to-Circuit Card optical connection. One Circuit card, 444, has an optical connection with the inner surface of the enclosure, 446, this is a Circuit Card-to-Enclosure optical pathway. One light source, 452, is shown, this light sources provide the photons used in the retro-reflection communications.

FIG. 6, Optically Transparent Electrically Conductive Medium with Suspended Integrated Circuits with Retro-reflector Communications, provides a futuristic computer system design wherein the ICs are suspended in an electrically conductive medium. Container, 600, contains the medium, shown in this example as a fluid. A single internal light source, 601, provides all the photons for the IC-IC communications. ICs inside the medium, 602, 603, 604, 605, and 606, (labels are 'A', 'B', 'C', 'D', and 'E') are the components of the computing system. For clarity no internal communications between ICs ('A' through 'E') are shown, but the ICs are optically interconnected. One optical interconnect, 607, is shown because it is the computer's interface with the IC 'F', 608, on the outside of the container, 600, no specific light source is shown as many can be provided including from the light, 601, inside the container, 600. Also not shown is the power source. IC 'F', 608, is a placeholder for the next connection. The next connection could be a human interface device, or even another container like container 600.

FIG. 7, Block Diagram of Independent Data Streams to Isolated Analysis Computing System, reflects the isolated streams, and the one-way porting of data from each isolated stream into the Analysis Computing System where anomalous behavior is defined. Four data streams are noted, the top one is the stream from the computing system, 705, and the only stream that is potentially hacked. Photonic only data comes from two streams: Data Stream, 706A, from Independent Facility Sources Connected via Retro-Reflector, & other Photonic Technologies, 706, & Data Stream, 708A, from Independent Sensors and Monitors of Computing System Connected via Retro-Reflector & other Photonic Technologies, 708. One data stream can use the telephony networks: Data Stream, 707A, from Independent Sources Tracking User, Retro-Reflector & other Photonic Technologies and Telephony Technology, 707.

The Analysis Computing System, 777, and all items except, the Computing System, 705, are optically or telephonically isolated and not within reach of the hacker of the computing system, 705, therefore the lines outlining them and the arrows for their data transport to the Analysis Computing System are solid. The Computing System, 705, is outlined with a dashed perimeter, reflecting the fact that data from the Computing System are potentially compromised by a hack.

The method of identifying anomalous computer system performance, uses two isolated independent data sets are compared the first data set is generated by the computer system operating system, and the second data set is generated by passive sensors transmitting their data via free space optical communications inaccessible by the computing system. The passive sensors' data has high correlation to parameters within the first data set. The analysis is looking for miscompares.

The method includes receiving first data from a first device via a first data path, the first device normally being accessed by a user, receiving second data from a second device associated with a user via a second data path. The method further includes receiving optional third data from a third data source associated with the user via a third data path and comparing the first data, the second data and the optionally the third data to base-line data comprising usage pattern of the user to yield a comparison. Finally, when the comparison indicates an anomaly from the base-line data, the method includes providing a notice that access to the first device is not authorized. FIG. 8, shows a gateway connection for the control device of FIG. 2.

We claim:

1. A method of restricting Input/Output functionality of a computing system, wherein a first device is plugged into an existing interface port of the computing system, wherein the installed first device disables all Input/Output circuitry of the computing system, rerouting all Input/Output functionality of the computing system through the installed first device, maintaining all Input/Output of the installed first device in a disabled open circuit state until specifically enabled by a local user command issued from a second user controlled device after a valid user request of Internet access is received, wherein the second device is never connected to the Internet
   wherein the second device is independent and isolated from the internet:
   wherein the second device is never connected to the computing system being protected;
   wherein the second device is independent and isolated from the computing system being protected; and
   wherein data are transferred by an optical link not observable to a hacker.

2. A method of claim 1 wherein highly localized free space optical communication transport occurs within the installed first device bridging an Air Gap within the first device to facilitate physical and logical isolation between electronic components of the computing system and the Input/Output circuitry.

3. A method of claim 2 wherein the first device electronics electrically and logically connected to the computing system include; processing control logic and data management, memory overwrite including a pseudo-random First-in First Out buffer, and a highly localized device enable optical signal port to receive an optical enable signal from a second user controlled device, and the first device electronics electrically and logically connected to the external Input/Output interface, to the Internet, include; data management, memory overwrite including a pseudo-random First-In First Out buffer, and a highly localized device enable optical signal port to receive an optical enable signal from a second user controlled device.

4. A method of claim 2 wherein the free space optical communications transport is selected to be compatible with the computing system data transport rates to and from the Internet, selected from the following types; two passive nodes using ambient light as their photon source, one active node providing photons and one passive node using photons from a photon source, and two active nodes wherein all photons are supplied by the active nodes.

5. A method according to claim 2 wherein the first device's open circuit state is a physical air gap within the circuit wherein the air gap is closed with a free space optical communications transport using an electro-optical transceiver after receipt of authorization from the second device to the first device via directed electro-optical transceiver, wherein time duration of the air gap closed state condition is defined by a microprocessor in the first device.

6. A method of claim 1 wherein the distance between the first device and the second device is less than 20 feet.

7. A method according to claim 1 for enabling the external Input/Output functionality of a computing system, to and from the Internet using the first device, when the Input/Output functionality is disabled by design, via the second user controlled device after a valid user request of Internet access is received through the first device.

8. A method of claim 7 wherein the enabling user controlled device uses a highly localized free space optical communication.

9. A method according to claim 1 for enabling the external Input/Output functionality of a computing system, to and from the Internet using the first device, when the Input/Output functionality is disabled by design, via multiple the second user controlled device after a valid user request of Internet access is received through the first device.

10. A method according to claim 1 where the user controlled devices have attributes selected from the following; biomarkers, codes, embedded in user objects, limited beam divergence, cat-eye beam divergence.

11. A method according to claim 1 for building components, assemblies, and integration of components wherein dongle-like short range free space optical communications enable secure pathways and enhances performance.

12. A method according to claim 11 wherein the dongle-like free space optical communications is selected between combinations of the following; subassemblies on an integrated chip, integrated chips, circuit cards, and enclosures.

13. A method according to claim 12 wherein the enclosure houses an electrically conductive optically transparent medium at the wavelength of the free space optical communications carrier frequency, powering the chips and circuit cards, communicating outside the enclosure via a portal.

14. A method according to claim 1 wherein the first device closes the circuit achieving connectivity with the internet for a time duration sufficient to complete the user requested data transfer, the state wherein the first device returns to an open circuit upon completion of the data transfer.

15. A method of restricting Input/Output functionality of a computing system, to and from the Intranet, wherein a first device is plugged into an existing interface port of the computing system, wherein the installed first device disables all Input/Output circuitry of the computing system, rerouting all Input/Output functionality of the computing system through the installed first device, maintaining all Input/Output of the installed first device in a disabled open circuit state until specifically enabled by a local user command issued from a second user controlled device after a valid user request of Intranet access is received, wherein the second device is never connected to the intranet;

wherein highly localized free space optical communication transport occurs within the installed first device bridging an Air Gap within the first device to facilitate physical and logical isolation between electronic components of the computing system and the Input/Output circuitry; and wherein the first device electronics electrically and logically connected to the computing system include: processing control logic and data management, memory overwrite including a pseudo-random First-in First Out buffer, and a highly localized device enable optical signal port to receive an optical enable signal from a second user controlled device, and the first device electronics electrically and logically connected to the external Input/Output interface, to the Internet, include: data management, memory overwrite including a pseudo-random First-In First Out buffer, and a highly localized device enable optical signal port to receive an optical enable signal from a second user controlled device.

16. A method of claim 15 wherein the distance between the first device and the second device is less than 20 feet.

17. A method of restricting Input/Output functionality of a computing system, wherein a first device is plugged into an existing interface port of the computing system, wherein the installed first device disables all Input/Output circuitry of the computing system, rerouting all Input/Output functionality of the computing system through the installed first device, maintaining all Input/Output of the installed first device in a disabled open circuit state until specifically enabled by a local user command issued from a second user controlled device after a valid user request of Internet access is received, wherein the second device is never connected to the Internet;

wherein highly localized free space optical communication transport occurs within the installed first device bridging an Air Gap within the first device to facilitate physical and logical isolation between electronic components of the computing system and the Input/Output circuitry; and wherein the first device electronics electrically and logically connected to the computing system include: process control logic and data management, memory overwrite including a pseudo-random First-In First Out buffer, and a highly localized device enable optical signal port to receive an optical enable signal from a second user controlled device and the first device electronics electrically and logically connected to the external Input/Output interface, to the Internet, include; data management, memory overwrite including a pseudo-random First-In First Out buffer, and a highly localized device enable optical signal port to receive an optical enable signal from a second user controlled device.

18. A method of restricting Input/Output functionality of a computing system, wherein a first device is plugged into an existing interface port of the computer system, wherein the installed first device disables all Input/Output circuitry of the computing system, rerouting all Input/Output functionality of the computing system through the installed first device, maintaining all Input/Output of the installed first device in a disabled open circuit state until specifically enabled by a local user command issued from a second user controlled device after a valid user request of the Internet access is received; wherein the second device is never connected to the Internet; and identifying anomalous computer system performance, wherein two isolated independent data sets are compared, first data set is generated by passive sensors transmitting their data via free space optical communications inaccessible by the computing system, said passive sensors' data has high correlation to parameters within the first data set, analysis is looking for miscompares.

\* \* \* \* \*